Patented Feb. 5, 1952

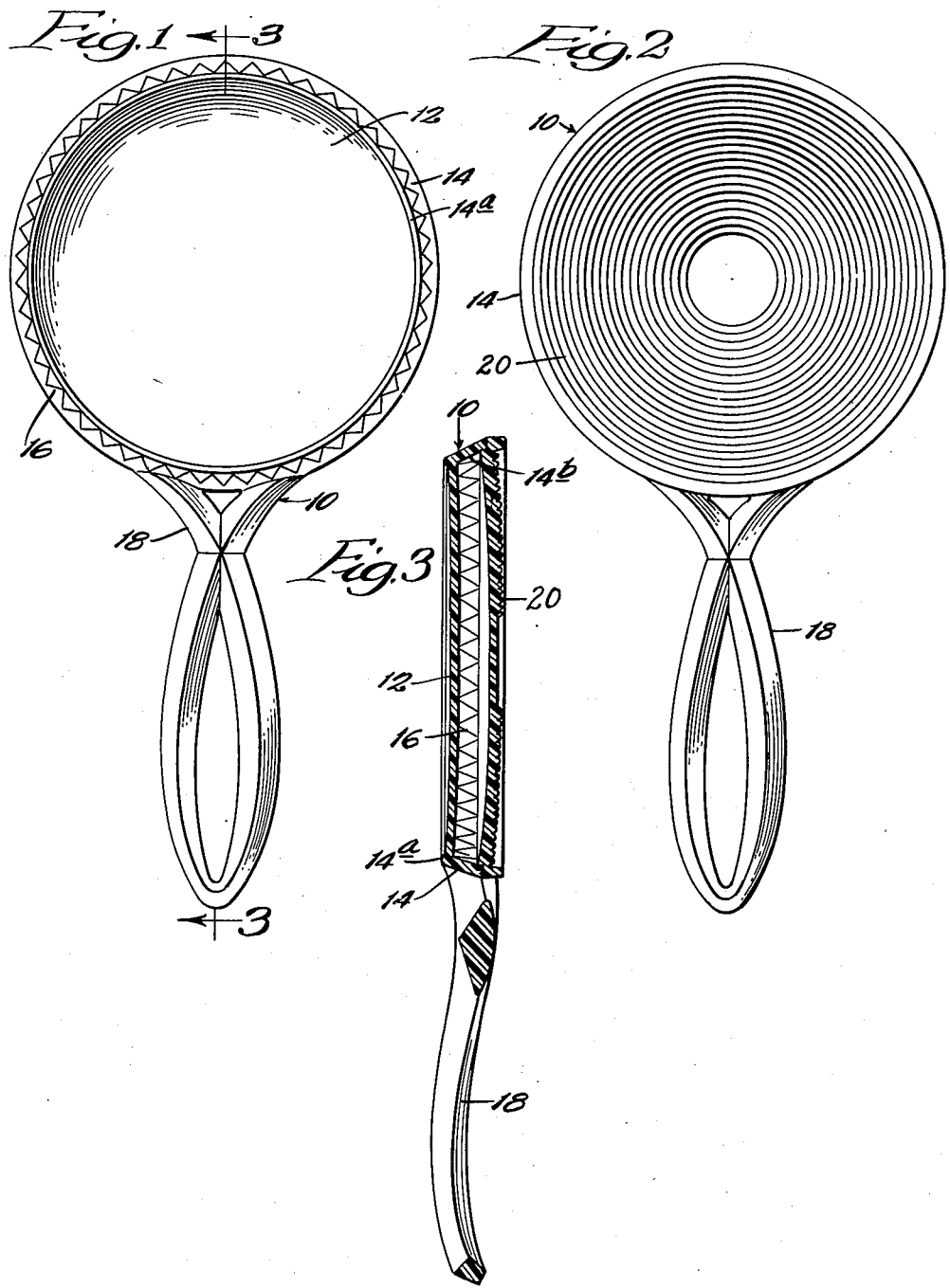

2,584,829

UNITED STATES PATENT OFFICE 2,584,829

HAND MIRROR AND SUPPORTING HANDLE

James F. Barnes, Chicago, Ill.

Application August 16, 1950, Serial No. 179,789

2 Claims. (Cl. 88—102)

My invention relates to an improved hand mirror having a handle formed unitarily with the silvered face and adaptable for the construction of an inexpensive and yet attractive structure.

Hand mirrors are conventionally constructed with metal frames including a handle and rim. A silvered glass disk is placed in the rim and covered on its back side with cardboard and some type of attractive cover which is secured at its edges to the rim. This many piece construction gives rise to assembly operations which increase production costs and requires the handling of the mirrored glass disks which form the reflecting medium.

In accordance with the present invention the assembling steps and the necessity of handling mirrored surfaces are avoided by the use of a unitary structure that forms practically the complete hand mirror and requires only the application of a protective cover disk to complete the unit. In addition, the structure of the present invention permits the use of mirrored surfaces in the rim and thereby gives rise to artistic effects not available in conventional mirror structures.

It is therefore a general object of the present invention to provide an improved hand mirror characterized by simplicity, ease of manufacture, and low cost.

Another object of the present invention is to provide an improved hand mirror having structural features permitting the attainment of new artistic effects.

The novel features which I believe to be characteristic of my invention are set forth with particularity in the appended claims. My invention itself, however, both as to its organization and method of operation, together with further objects and advantages thereof, will best be understood by reference to the following description taken in connection with the accompanying drawings, in which:

Figure 1 is an elevational view from the front of a mirror constructed in accordance with the principles of the present invention;

Figure 2 is a view of the mirror of Figure 1 as seen from behind; and,

Figure 3 is a cross-sectional view through axis 3—3, Figure 1.

Referring now to Figure 1, the mirror comprises a body 10 of plastic or the like which at its upper portion 12 defines a flat circular transparent sheet. A rim 14 is formed about the periphery of this sheet and extends slightly forwardly at 14a and more considerably backwardly at 14b in a generally beveled configuration. Corrugations 16 are formed in the inner surface of rim 14 to line the portion 14b of the rim with a series of triangular plane surfaces extending about the inner periphery of the rim.

At its bottom portion, the rim 14 extends downwardly to form the handle 18 which is formed unitarily with the body 10 and as a part thereof. This handle is shown in an artistic crossed web shape of somewhat streamlined configuration but may be of other suitable shape if desired.

The back face of the disk 12, and the inner edges of the beveled rim 14, define an open cavity which is closed by the cap or closure plate 20. This cap is of plastic or similar suitable material shaped to fit in the edges of the opening of the cavity as defined by the rim 14. The cap is preferably of an opaque material and is sealed in place by a suitable cement. A circular or other artistic design is formed on the back face of the cap to provide an attractive appearance.

The transparent disk panel portion 12 is silvered on its inside surface to provide an effective mirror or reflecting area. Preferably this is accomplished by the use of the vacuum process, although other methods may be used.

A unique structural feature of the present invention that gives rise to new and striking artistic effects is the provision of the surfaces 16 of the rim 14 which themselves may be silvered. With the rim formed of transparent plastic, this gives rise to numerous triangular areas having different but systematically related orientations with respect to the body 10, thereby producing unique reflection effects that are highly attractive and interesting.

While I have shown and described a specific embodiment of the present invention using plastic material, it will of course be understood that other materials, such as glass, may be used and that by the appended claims I intend to cover all such alternative constructions falling within the true spirit and scope thereof.

What I claim as new and desire to secure by Letters Patent of the United States is:

1. A mirror structure comprising a body providing a transparent disc panel portion surrounded by a transparent cavity-defining rim and having a handle attached to the opposite side of the rim, the surface of the transparent disc portion within the cavity and the rim surface facing the cavity being silvered to provide light reflecting surfaces, and a closure cap carried by said rim and extending across said cavity at a spaced distance from said transparent disc panel portion to protect the silvered faces of the transparent disc panel portion and the rim.

2. A hand mirror comprising a transparent ring-shaped rim, a transparent disc panel portion extending across one end of the rim to provide an accessible cavity, said rim having corrugations on the inner surface thereof behind said transparent disc panel portion, a handle attached to the outer surface of said rim, the inner surface of the transparent disc panel portion and the inner corrugated rim surface being silvered, and a closure cap affixed to the other end of the rim to protect the silvered surfaces of the disc panel portion and the rim.

JAMES F. BARNES.

REFERENCES CITED

The following references are of record in the file of this patent:

UNITED STATES PATENTS

| Number | Name | Date |
|---|---|---|
| Re. 8,905 | Eastman | Sept. 23, 1879 |
| 883,094 | Debacher | Mar. 24, 1908 |
| 1,490,407 | Vallely | Apr. 15, 1924 |
| 1,786,958 | Cestnaes | Dec. 30, 1930 |
| 2,163,001 | Komorous | June 20, 1939 |
| 2,428,975 | Lamb | Oct. 14, 1947 |